(12) United States Patent
Kordybach et al.

(10) Patent No.: US 10,945,173 B2
(45) Date of Patent: Mar. 9, 2021

(54) PCI ALLOCATION IN LTE-U

(71) Applicant: NOKIA SOLUTIONS AND NETWORKS OY, Espoo (FI)

(72) Inventors: Krzysztof Kordybach, Pulawy (PL); Antti Anton Toskala, Espoo (FI); Colin Willcock, Nurtingen (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/320,696

(22) PCT Filed: Jul. 25, 2016

(86) PCT No.: PCT/EP2016/067628
§ 371 (c)(1),
(2) Date: Jan. 25, 2019

(87) PCT Pub. No.: WO2018/019356
PCT Pub. Date: Feb. 1, 2018

(65) Prior Publication Data
US 2019/0159087 A1 May 23, 2019

(51) Int. Cl.
*H04W 36/08* (2009.01)
*H04W 24/02* (2009.01)
(Continued)

(52) U.S. Cl.
CPC ............ *H04W 36/08* (2013.01); *H04W 8/26* (2013.01); *H04W 24/02* (2013.01); *H04W 76/11* (2018.02); *H04W 76/34* (2018.02)

(58) Field of Classification Search
None
See application file for complete search history.

(56) References Cited

U.S. PATENT DOCUMENTS

| 2010/0291929 A1* | 11/2010 | Stephens | H04W 24/02 |
| | | | 455/436 |
| 2012/0231792 A1* | 9/2012 | Michel | H04W 36/0083 |
| | | | 455/436 |

(Continued)

FOREIGN PATENT DOCUMENTS

| CN | 102 421 101 B | 11/2013 |
| EP | 2 785 100 A1 | 10/2014 |
| WO | WO 2010/132194 A1 | 11/2010 |

OTHER PUBLICATIONS

International Search Report & Written Opinion dated May 26, 2017 corresponding to International Patent Application No. PCT/EP2016/067628.

(Continued)

*Primary Examiner* — Gregory B Sefcheck
*Assistant Examiner* — Amarnauth G Persaud
(74) *Attorney, Agent, or Firm* — Squire Patton Boggs (US) LLP

(57) ABSTRACT

It is provided a method, comprising monitoring if a cell is being started; selecting a temporary physical cell identifier among a predefined pool; instructing the cell to adopt the selected temporary physical cell identifier if the cell is being started; determining a permanent physical cell identifier for the cell, wherein the permanent physical cell identifier does not belong to the predefined pool and is different from each used physical cell identifier, wherein the used physical cell identifiers are indicated in measurement reports; checking if a first time has elapsed after the cell has been instructed to adopt the selected temporary physical cell identifier or a second time has elapsed after the cell has been started; replacing the selected temporary physical cell identifier by the determined permanent physical cell identifier if the first time or the second time has elapsed.

7 Claims, 3 Drawing Sheets

(51) Int. Cl.
  *H04W 76/34*  (2018.01)
  *H04W 76/11*  (2018.01)
  *H04W 8/26*   (2009.01)

(56) References Cited

U.S. PATENT DOCUMENTS

| | | | | |
|---|---|---|---|---|
| 2012/0322436 A1* | 12/2012 | Asado | ................. | H04W 52/143 |
| | | | | 455/422.1 |
| 2014/0126547 A1* | 5/2014 | Tamura | ............. | H04W 36/0088 |
| | | | | 370/332 |
| 2016/0073274 A1* | 3/2016 | Burley | ................. | H04W 24/02 |
| | | | | 455/422.1 |
| 2019/0007870 A1* | 1/2019 | Gupta | ............... | H04W 36/0061 |
| 2019/0223064 A1* | 7/2019 | Tamura | ............. | H04W 36/0055 |

OTHER PUBLICATIONS

Nokia Networks, "PCI confusion and collision in Laa system," 3GPP Draft; R2-151382, 3GPP TSG-RAN WG2 Meeting #89bis, Bratislava, Slovakia, Apr. 19, 2015, XP050936323.

* cited by examiner

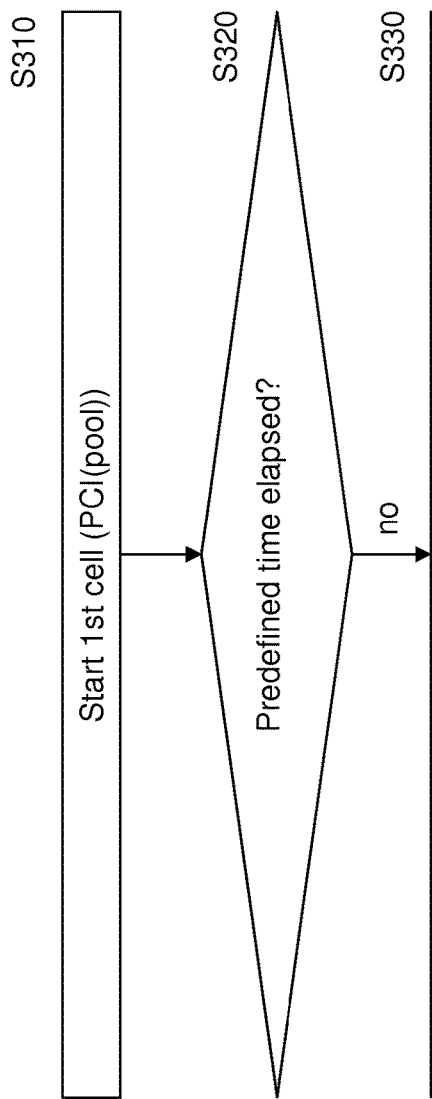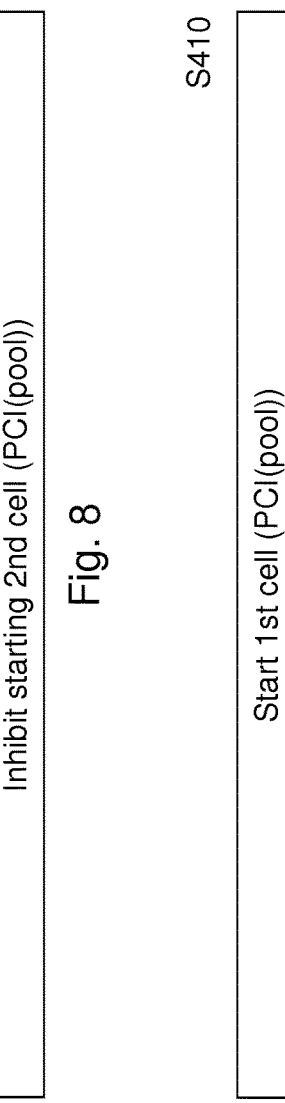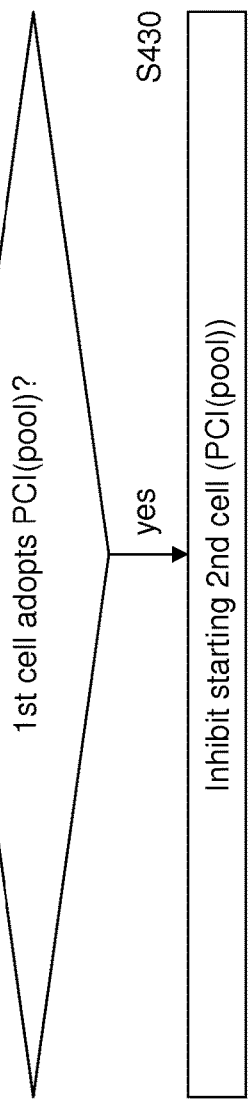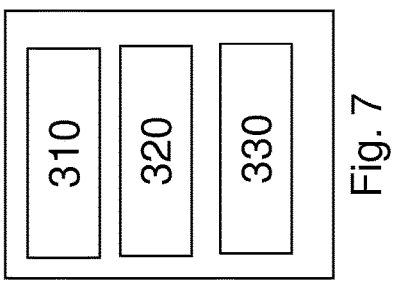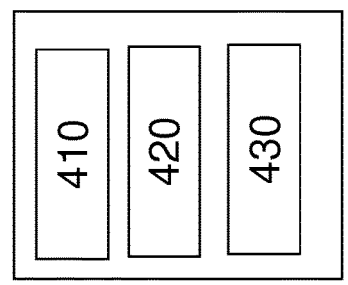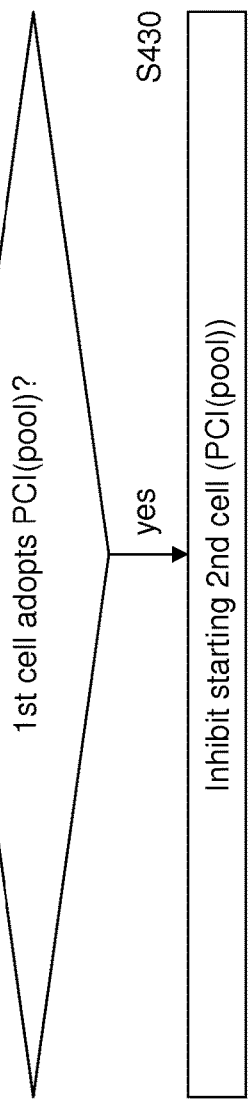

PCI ALLOCATION IN LTE-U

FIELD OF THE INVENTION

The present invention relates to an apparatus, a method, and a computer program product related to PCI allocation. More particularly, the present invention relates to an apparatus, a method, and a computer program product related to PCI allocation e.g. in unlicensed bands.

ABBREVIATIONS

3GPP 3$^{rd}$ Generation Partnership Project
DL Downlink
eNB evolved NodeB
HeNB Home eNB
HO Handover
LTE Long Term Evolution
LTE-A LTE-Advanced
LTE-U LTE in unlicensed spectrum
MME Mobility Management Entity
OAM Operation and Maintenance
PCI Physical Cell Identifier
RNC Radio Network Controller
S1 Interface eNB—MME or SGW
SGW Serving Gateway
SSID Service Set Identifier
UE User Equipment
WiFi Wireless Fidelity
X2 Interface eNB—eNB

BACKGROUND OF THE INVENTION

Originally, LTE has been developed for licensed spectrum. This means LTE deployments were assumed to be coordinated by a single operator in the bands it was assigned. That meant the PCI allocation could be done automatically, because the eNBs could communicate (they were connected via X2/S1) and therefore, they could negotiate the PC's. In the rare cases where two operators could use the same band in adjacent regions (e.g. in two countries), the planning was done manually.

Following the success of LTE, some operators saw opportunity in using non-licensed bands. This is reflected in the growing interest among operators. For example, recently a forum called MuLTEfire™ has been established to create initial, pre-3GPP vision of standalone deployment of LTE in unlicensed bands. Such deployments face additional challenges related to the PCI planning: a PCI shall be unique within the coverage area, but in unlicensed spectrum more than one operator may exist.

Note that according to current LTE standards, there are only 504 different PC's, such that the PCIs are used several times in a large network with thousands of cells. The operator has to take care in PCI allocation that a UE cannot see two cells with a same PCI simultaneously.

PCI is used e.g. in preparing handover. There, UE reports to eNB about the signal strength (and other parameters) of a potential target cell using PCI of the potential target cell. If eNB decides that HO should be performed, eNB requests UE to obtain the Global Cell Id of the target cell, based on the reported PCI. The Global Cell ID is unique. Thus, eNB can unambiguously instruct the UE to perform handover to the target cell and can also perform the necessary steps towards the core network.

One of the problems of the LTE deployment in unlicensed spectrum is PCI allocation: operators grew accustomed to automatic allocation, but this is designed to work within a single operator network. This due to the fact that it requires that the eNBs are connected with X2 or S1, so that they can exchange information about served cells (also, information about one tier more is exchanged as "neighbour information" for each served cell). In unlicensed deployments several operators may use the same spectrum, their eNBs may coexist in vast areas. However, they will not be interconnected with X2 or S1 and will not exchange information about served cells.

If PCI allocation is not coordinated, the problem of PCI confusion and PCI collision may occur:

PCI confusion: the UE is able to receive a pilot signal from two distant cells using the same PCI. However, only one of them is known to the serving cell of the UE. When the UE reports about a HO target cell, the UE might report about the cell not known to eNB. If handover is ordered, the UE is then directed to a wrong cell and HO fails.

PCI collision: the UE can receive a pilot signal from a cell that uses the same PCI as the UE's serving cell. The result is similar: the UE is not able to report about the other cell and may not even report a HO opportunity. In this scenario, since it affects all UEs served in either of the cells, the HO failure rate is massive.

Some solution candidates to these problems that might be considered are as follows:

Manual coordination and/or allocation: operators negoatiate ranges of PCIs used and then either allow automatic allocation within assigned ranges or manually allocate the PCIs to affected eNBs. This is what is currently used at country borders. However, this assumes that the operators are mutually known to one another and that their list is closed—no new operator is expected to join. It is therefore useless for unlicensed deployments, where operators can deploy cells at any time and are not certified (i.e. private networks are possible, too).

For HeNB PC's, there is a separate pool of PC's, which does not overlap with the macro cell PCI pool. Thus, PCI conflicts between the planned deployment (macro cells) and the ad-hoc deployments (home eNBs) are avoided. However, conflicts among HeNBs (e.g. existing and new cells) are not avoided, presumably because they occur seldom due to the small coverage area of the HeNBs and because the HeNBs of one area belong to a same operator such that overlaps are mostly avoided. If such conflicts nevertheless occur, they may be solved by DL receiver described next.

DL receiver in the eNB: this is more robust and resembles solution adopted for HeNB deployments. Here, the eNB, after having been switched on, starts listening in the DL to catch the PCIs of the already existing eNBs in the area. Once statistics are collected, it selects another PCI and switches on the DL transmitter.

As mentioned, the solution is relatively robust, but it assumes very small coverage area of the eNB. Basically, the eNB is assumed to be within "umbrella coverage" of a regular eNB. Otherwise, if this assumption does not hold, the problem of PCI confusion is still possible: the eNB avoided PCIs of the eNBs it can hear, but it has no guarantee that some of its UEs at cell border are not able to catch signal from distant cell of the same PCI. (In addition, it should be mentioned that DL receiver is costly and therefore not always wanted in commercial products aimed at consumer markets.)

Finally, the eNBs can rely on the reports of UE HO failures. This is the ultimate step, once nearby PCIs are eliminated using the DL receiver. This method indeed can help, but is extremely expensive: each information about a PCI confusion is received at the cost of a failed connection. Hardly any operator would accept it as a baseline method to select PC's. Especially in LTE-U deployments this would be permanent process (once such a conflict is detected, own PCI must be changed, which opens possibly new conflicts elsewhere).

Yet another, though non-existent solution is to enable inter-operator X2. This solution is not really feasible for LTE-U due to the fact that X2 enables to exchange a lot of configuration information that operators consider proprietary.

SUMMARY OF THE INVENTION

It is an object of the present invention to improve the prior art.

According to a first aspect of the invention, there is provided an apparatus, comprising monitoring means adapted to monitor if a cell is being started; selecting means adapted to select a temporary physical cell identifier among a predefined pool of temporary physical cell identifiers; instructing means adapted to instruct the cell to adopt the selected temporary physical cell identifier as the physical cell identifier of the cell if the cell is being started; determining means adapted to determine a permanent physical cell identifier for the cell, wherein the permanent physical cell identifier does not belong to the predefined pool and is different from each used physical cell identifier, wherein each of the used physical cell identifiers is indicated in a respective measurement report received while the cell is instructed to adopt the selected temporary physical cell identifier; time checking means adapted to check if at least one of a first time has elapsed after the cell has been instructed to adopt the selected temporary physical cell identifier and a second time has elapsed after the cell has been started; replacing means adapted to replace the selected temporary physical cell identifier by the determined permanent physical cell identifier as the physical cell identifier of the cell if the at least one of the first time and the second time has elapsed.

At least one of the first time and the second time may be predefined.

The apparatus may further comprise evaluating means adapted to evaluate a number of used physical cell identifiers indicated in a predefined number of measurement report received first after the cell was instructed to adopt the selected temporary physical cell identifier; and setting means adapted to set at least one of the first time and the second time based on the number of used physical cells if the respective one of the first time and the second time is not predefined.

The replacing means may be adapted to reboot the cell in order to replace the selected temporary physical cell identifier by the determined permanent physical cell identifier as the physical cell identifier of the cell.

According to a second aspect of the invention, there is provided an apparatus comprising checking means adapted to check if a measurement report is received from a terminal, wherein the measurement report indicates a physical cell identifier, the indicated physical cell identifier belongs to a predefined pool of physical cell identifiers, and there is at least one physical cell identifier not belonging to the predefined pool; instructing means adapted to instruct a control device to give preference to a handover of the terminal to a target cell corresponding to the indicated physical cell identifier if the indicated physical cell identifier belongs to the predefined pool.

The instructing means may be adapted to instruct the control device to make the terminal perform the handover to the target cell if the indicated physical cell identifier belongs to the predefined pool and the target cell is suitable to serve the terminal.

According to a third aspect of the invention, there is provided an apparatus, comprising checking means adapted to check if a physical cell identifier received from a cell not serving a terminal belongs to a predefined pool of physical cell identifiers, wherein there is at least one physical cell identifier not belonging to the predefined pool; and at least one of requesting means adapted to request a preferred handover of the terminal to the cell if the physical cell identifier belongs to the predefined pool; and selecting means adapt to select the cell for serving the terminal if the physical cell identifier belongs to the predefined pool.

According to a fourth aspect of the invention, there is provided an apparatus, comprising starting means adapted to start a first cell such that the first cell adopts a first physical cell identifier out of a predefined pool of physical cell identifiers as a physical cell identifier of the first cell, wherein there is at least one physical cell identifier not belonging to the predefined pool; checking means adapted to check if a predefined waiting time has elapsed after the first cell has been started; inhibiting means adapted to inhibit the starting means from starting a second cell if the predefined waiting time has not elapsed, wherein the second cell is different from the first cell, and the second cell is started such that it adopts a second physical cell identifier out of the predefined pool as a physical cell identifier of the second cell.

According to a fifth aspect of the invention, there is provided an apparatus, comprising starting means adapted to start a first cell such that the first cell adopts a first temporary physical cell identifier out of a predefined pool of temporary physical cell identifiers as a physical cell identifier of the first cell, wherein there is at least one physical cell identifier not belonging to the predefined pool; monitoring means adapted to monitor if the first cell adopts the first temporary physical cell identifier as the physical cell identifier of the first cell; inhibiting means adapted to inhibit the starting means from starting a second cell while the first cell adopts the first temporary physical cell identifier as the physical cell identifier of the first cell, wherein the second cell is different from the first cell, and the second cell is started such that it adopts a second temporary physical cell identifier out of the predefined pool as a physical cell identifier of the second cell.

According to a sixth aspect of the invention, there is provided an apparatus, comprising monitoring circuitry configured to monitor if a cell is being started; selecting circuitry configured to select a temporary physical cell identifier among a predefined pool of temporary physical cell identifiers; instructing circuitry configured to instruct the cell to adopt the selected temporary physical cell identifier as the physical cell identifier of the cell if the cell is being started; determining circuitry configured to determine a permanent physical cell identifier for the cell, wherein the permanent physical cell identifier does not belong to the predefined pool and is different from each used physical cell identifier, wherein each of the used physical cell identifiers is indicated in a respective measurement report received while the cell is instructed to adopt the selected temporary physical cell identifier; time checking circuitry configured to check if at least one of a first time has elapsed after the cell has been instructed to adopt the selected temporary physical cell identifier and a second time has elapsed after the cell has been started; replacing circuitry configured to replace the selected temporary physical cell identifier by the determined permanent physical cell identifier as the physical cell identifier of the cell if the at least one of the first time and the second time has elapsed.

At least one of the first time and the second time may be predefined.

The apparatus may further comprise evaluating circuitry configured to evaluate a number of used physical cell identifiers indicated in a predefined number of measurement report received first after the cell was instructed to adopt the selected temporary physical cell identifier; and setting circuitry configured to set at least one of the first time and the second time based on the number of used physical cells if the respective one of the first time and the second time is not predefined.

The replacing circuitry may be configured to reboot the cell in order to replace the selected temporary physical cell identifier by the determined permanent physical cell identifier as the physical cell identifier of the cell.

According to a seventh aspect of the invention, there is provided an apparatus comprising checking circuitry configured to check if a measurement report is received from a terminal, wherein the measurement report indicates a physical cell identifier, the indicated physical cell identifier belongs to a predefined pool of physical cell identifiers, and there is at least one physical cell identifier not belonging to the predefined pool; instructing circuitry configured to instruct a control device to give preference to a handover of the terminal to a target cell corresponding to the indicated physical cell identifier if the indicated physical cell identifier belongs to the predefined pool.

The instructing circuitry may be configured to instruct the control device to make the terminal perform the handover to the target cell if the indicated physical cell identifier belongs to the predefined pool and the target cell is suitable to serve the terminal.

According to an eighth aspect of the invention, there is provided an apparatus, comprising checking circuitry configured to check if a physical cell identifier received from a cell not serving a terminal belongs to a predefined pool of physical cell identifiers, wherein there is at least one physical cell identifier not belonging to the predefined pool; and at least one of requesting circuitry configured to request a preferred handover of the terminal to the cell if the physical cell identifier belongs to the predefined pool; and selecting circuitry adapt to select the cell for serving the terminal if the physical cell identifier belongs to the predefined pool.

According to a ninth aspect of the invention, there is provided an apparatus, comprising starting circuitry configured to start a first cell such that the first cell adopts a first physical cell identifier out of a predefined pool of physical cell identifiers as a physical cell identifier of the first cell, wherein there is at least one physical cell identifier not belonging to the predefined pool; checking circuitry configured to check if a predefined waiting time has elapsed after the first cell has been started; inhibiting circuitry configured to inhibit the starting circuitry from starting a second cell if the predefined waiting time has not elapsed, wherein the second cell is different from the first cell, and the second cell is started such that it adopts a second physical cell identifier out of the predefined pool as a physical cell identifier of the second cell.

According to a tenth aspect of the invention, there is provided an apparatus, comprising starting circuitry configured to start a first cell such that the first cell adopts a first temporary physical cell identifier out of a predefined pool of temporary physical cell identifiers as a physical cell identifier of the first cell, wherein there is at least one physical cell identifier not belonging to the predefined pool; monitoring circuitry configured to monitor if the first cell adopts the first temporary physical cell identifier as the physical cell identifier of the first cell; inhibiting circuitry configured to inhibit the starting circuitry from starting a second cell while the first cell adopts the first temporary physical cell identifier as the physical cell identifier of the first cell, wherein the second cell is different from the first cell, and the second cell is started such that it adopts a second temporary physical cell identifier out of the predefined pool as a physical cell identifier of the second cell.

According to an eleventh aspect of the invention, there is provided a method, comprising monitoring if a cell is being started; selecting a temporary physical cell identifier among a predefined pool of temporary physical cell identifiers; instructing the cell to adopt the selected temporary physical cell identifier as the physical cell identifier of the cell if the cell is being started; determining a permanent physical cell identifier for the cell, wherein the permanent physical cell identifier does not belong to the predefined pool and is different from each used physical cell identifier, wherein each of the used physical cell identifiers is indicated in a respective measurement report received while the cell is instructed to adopt the selected temporary physical cell identifier; checking if at least one of a first time has elapsed after the cell has been instructed to adopt the selected temporary physical cell identifier and a second time has elapsed after the cell has been started; replacing the selected temporary physical cell identifier by the determined permanent physical cell identifier as the physical cell identifier of the cell if the at least one of the first time and the second time has elapsed.

At least one of the first time and the second time may be predefined.

The method may further comprise evaluating a number of used physical cell identifiers indicated in a predefined number of measurement report received first after the cell was instructed to adopt the selected temporary physical cell identifier; and setting at least one of the first time and the second time based on the number of used physical cells if the respective one of the first time and the second time is not predefined.

The replacing may comprise rebooting the cell in order to replace the selected temporary physical cell identifier by the determined permanent physical cell identifier as the physical cell identifier of the cell.

According to a twelfth aspect of the invention, there is provided a method comprising checking if a measurement report is received from a terminal, wherein the measurement report indicates a physical cell identifier, the indicated physical cell identifier belongs to a predefined pool of physical cell identifiers, and there is at least one physical cell identifier not belonging to the predefined pool; instructing a control device to give preference to a handover of the terminal to a target cell corresponding to the indicated physical cell identifier if the indicated physical cell identifier belongs to the predefined pool.

The instructing may comprise instructing the control device to make the terminal perform the handover to the target cell if the indicated physical cell identifier belongs to the predefined pool and the target cell is suitable to serve the terminal.

According to a thirteenth aspect of the invention, there is provided a method, comprising checking if a physical cell identifier received from a cell not serving a terminal belongs to a predefined pool of physical cell identifiers, wherein there is at least one physical cell identifier not belonging to the predefined pool; and at least one of requesting a preferred handover of the terminal to the cell if the physical cell identifier belongs to the predefined pool; and selecting the cell for serving the terminal if the physical cell identifier belongs to the predefined pool.

According to a fourteenth aspect of the invention, there is provided a method, comprising starting a first cell such that the first cell adopts a first physical cell identifier out of a predefined pool of physical cell identifiers as a physical cell identifier of the first cell, wherein there is at least one physical cell identifier not belonging to the predefined pool; checking if a predefined waiting time has elapsed after the first cell has been started; inhibiting starting a second cell if the predefined waiting time has not elapsed, wherein the second cell is different from the first cell, and the second cell is started such that it adopts a second physical cell identifier out of the predefined pool as a physical cell identifier of the second cell.

According to a fifteenth aspect of the invention, there is provided a method, comprising starting a first cell such that the first cell adopts a first temporary physical cell identifier out of a predefined pool of temporary physical cell identifiers as a physical cell identifier of the first cell, wherein there is at least one physical cell identifier not belonging to the predefined pool; monitoring if the first cell adopts the first temporary physical cell identifier as the physical cell identifier of the first cell; inhibiting starting a second cell while the first cell adopts the first temporary physical cell identifier as the physical cell identifier of the first cell, wherein the second cell is different from the first cell, and the second cell is started such that it adopts a second temporary physical cell identifier out of the predefined pool as a physical cell identifier of the second cell.

Each of the methods of the eleventh to fifteenth aspects may be a method of PCI allocation.

According to a sixteenth aspect of the invention, there is provided a computer program product comprising a set of instructions which, when executed on an apparatus, is configured to cause the apparatus to carry out the method according to any of the eleventh to fifteenth aspects. The computer program product may be embodied as a computer-readable medium or directly loadable into a computer.

According to some example embodiments of the invention, at least one of the following technical effects may be provided, in particular if LTE is employed in an unlicensed band:
reduced PCI confusion;
reduced PCI collision;
reduced handover failures; and
reduced administration effort.

BRIEF DESCRIPTION OF THE DRAWINGS

Further details, features, objects, and advantages are apparent from the following detailed description of example embodiments of the present invention which is to be taken in conjunction with the appended drawings, wherein
FIG. 7 shows an apparatus according to an example embodiment of the invention;
FIG. 8 shows a method according to an example embodiment of the invention;
FIG. 9 shows an apparatus according to an example embodiment of the invention;
FIG. 10 shows a method according to an example embodiment of the invention;
and
FIG. 11 shows an apparatus according to an example embodiment of the invention.

DETAILED DESCRIPTION OF CERTAIN EXAMPLE EMBODIMENTS

Figure 2:
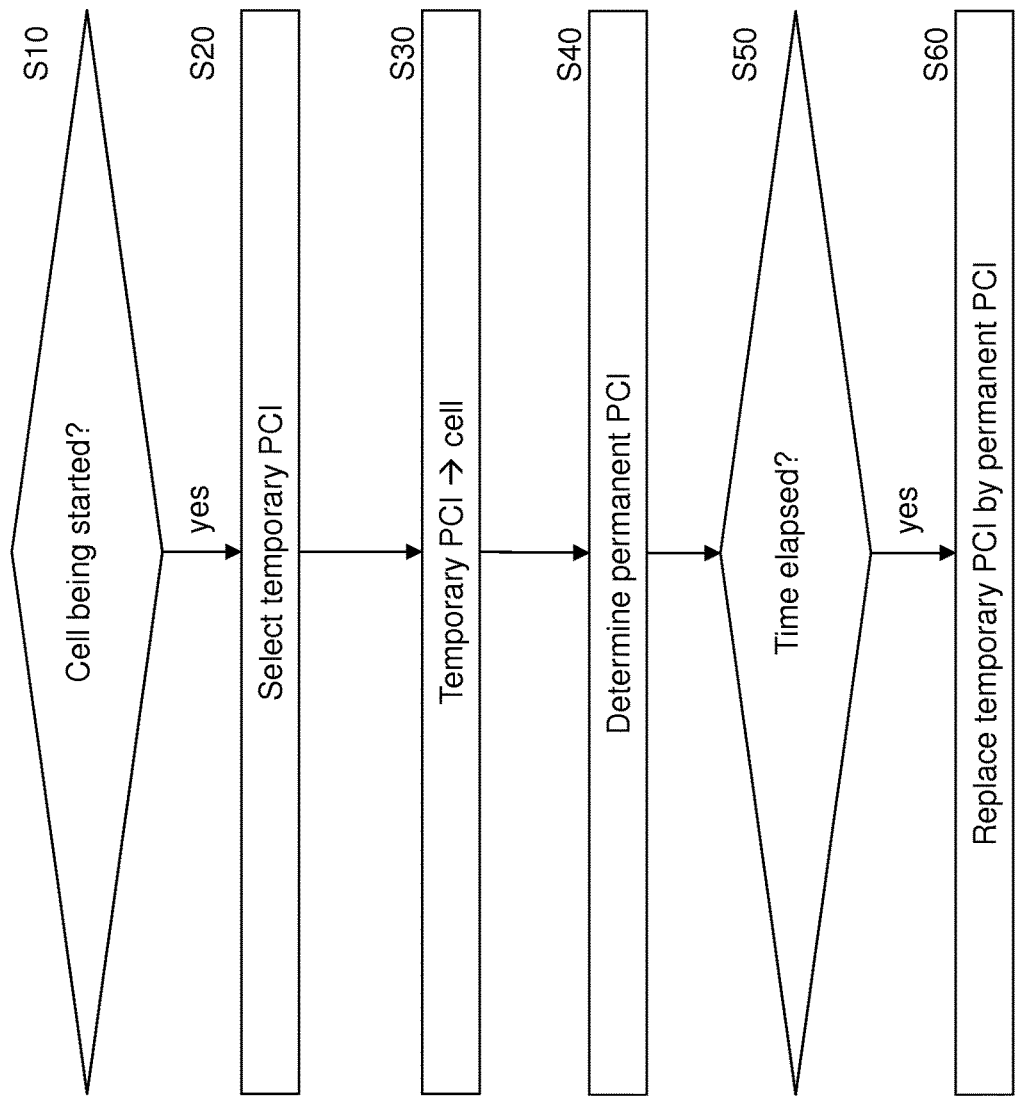
FIG. 2 shows a method according to an example embodiment of the invention.

Herein below, certain example embodiments of the present invention are described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Some embodiments of the invention provide a solution to enable fast and automatic allocation of PCIs in scenarios where the eNBs do not coordinate their used PCI number (e.g. because they are not able to coordinate). Thus, they directly address the above problem of LTE deployment in unlicensed spectrum.

According to some embodiments of the invention, two pools of PCIs are defined: a "temporary PCI" for start-up and "permanent PCI" for normal operation. Each PCI is in not more than one of the two pools; that is, the two pools of PCIs are disjunct. The two pools together may cover the whole amount of PCIs available, or they may cover a subset thereof.

Once an eNB is started in LTE-U mode, it uses one of the temporary PCIs (this may be selected randomly from the pool, or based on DL receiver listening). This PCI is used for limited amount of time to collect the statistics from the UEs (that is, based on the reports from the UEs, the permanent PCIs used by other cells in the neighbourhood are identified) . Once the statistics on the PCIs used in the neighbourhood (i.e. typically the direct neighbour cells and potentially also of cells not being direct neighbours (at larger distance than the direct neighbours)) are collected, the eNB replaces the temporary PCI by a permanent PCI that is not used yet in the neighbourhood. Depending on implementation, the replacement may comprise rebooting of the cell. In this case, the determined permanent PCI may be written into a non-volatile memory before the cell is shut down, and the permanent PCI is read out from the non-volatile memory when the cell is booted again.

At the UE side, the UE may be preconfigured to use the cells with the temporary PCIs first (e.g. at start up of the UE). Also, the UE may report to eNB that such a cell is preferred as a handover target. Thus, sufficient statistics may be collected faster.

Alternatively, eNB may evaluate the reports from the UE. If eNB detects that one of the potential target cells uses a temporary PCI of the predefined pool, it will order the UE to handover preferably to that potential target cell, provided that the potential target cell is suitable for serving the UE. For example, eNB may order the handover to that potential target cell regardless of whether other cells are more suitable to serve the UE. In another scenario, eNB may order the handover to that potential target cell as long as the terminal does not receive a signal from another cell that is stronger by a certain percentage (e.g. 20% or 50%) than the signal received from that potential target cell.

The time, during which the eNB uses (adopts) a temporary PCI for a cell may be predefined (e.g. as a time period from when the eNB is started, or as a time period after the temporary PCI was selected). Alternatively, the usage of the temporary PCI may be finished (and a permanent PCI may be used instead) when sufficient statistics are obtained. E.g., for this, it may be determined how many reports (or reports on how many cells) are received, and if this number exceeds a predetermined value, the temporary PCI is not used any more but a permanent PCI. These two conditions may be combined: the temporary PCI is used at least for a predefined time, and may be used for a longer time in order to obtain a sufficient statistics if necessary.

According to some embodiments of the invention, the two pools of PCIs are standardized, in order to guarantee that all eNB certified for LTE-U use the two pools and thus avoid PCI problems. The standardization may include the precise scopes of the pools. Then, at certification of the respective equipment (e.g. eNB, UE), this implementation is verified.

Alternatively, all operators of a certain area may mutually agree on the pools. However, this requires that a new operator does not operate in this area, or that this operator accedes the agreement. However, this procedure might often not be feasible in unlicensed bands.

An advantage of some embodiments of the invention is that likelihood of PCI confusion is much lower if only a subset of all deployed eNBs use PCIs that may create the problem. This is guaranteed by the fact that such temporary PCI are not used permanently. Therefore, a newly deployed eNB may select a PCI that was used by eNBs deployed only shortly before itself.

Each operator may avoid conflicts between his own cells by deploying new cells in the same region with a rate lower than the time of the usage of the temporary PCI. If this time is predefined, an automatic rollout of new cells may be easily realized. If the time is variable, an automatic rollout may still be realized, if the controller of the rollout (e.g. OAM) monitors if the last deployed cell still used a temporary PCI, and starts the next cell only when the previous cell does not use the temporary PCI any more.

The likelihood of a PCI collision among new cells depends practically only on the number of independent, non-cooperating operators and the number of temporary PCIs in the predefined pool. Assuming that each operator avoids conflicts within his own network, as discussed above, the minimum number of PCIs for temporary use is equal to the number of independent operators that may be switching on or rebooting their cells in the same area and time—plus one (to avoid conflict of the first and the last cells switched on within the period). Of course, if the collision is to be further minimised, that number must be increased. If the temporary pool has n temporary PCIs and the number of operators is k, then the probability P of collision in the area is:

$$P = \frac{\overline{V}_n^k - V_n^k}{\overline{V}_n^k} = \frac{n^k - \frac{n!}{(n-k)!}}{n^k} = 1 - \frac{n!}{n^k \cdot (n-k)!}$$

Here, $V_n^k$ and $\overline{V}_n^k$ represent a number of permutations without and with repetitions, respectively, of k-element combinations over n-element set.

This indicates that if k<<n (the number of operators is significantly lower than the number of temporary PCIs), then the probability of PCI collision diminishes. The number of PCIs that are in the temporary pool depends therefore on the operators' requirements and deployment assumptions. E.g., the number may be decided in the standardisation phase.

For the sake of completeness, an example is given here. If one considers that an LTE-U eNB has a conflict range of 50 m, and there can be up to 3 operators within such 100×100 m area that start or reboot their eNBs at the same time. If the collision probability is to be less than 10%, the number of PCIs must be at least 30.

Another aspect is the time the collision would occur. One must remember the collision, even if it does occur, will get resolved without any manual action, by itself, when the first of the colliding eNBs selects a permanent PCI. The time that is needed for the sensing (the period when the temporary PCI is used) depends again on the operators' requirements, but if it is to allow to collect statistics from UEs, it should be in the scale of tens of minutes. E.g., the time may be 5 minutes, 10 minutes, 15 minutes, or 20 minutes.

In order to shorten this time, it is useful that a UE prefers to (re)select to cells or to report, as a HO target, cells with such temporary PCIs (if authorised to use such and if the cell is suitable to serve the UE, of course). This would help collect sufficient statistics by the eNBs in "learning phase" (i.e., when the temporary PCI is used).

Figure 1:
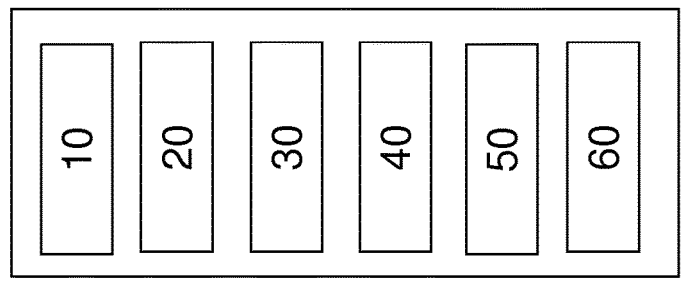
FIG. 1 shows an apparatus according to an example embodiment of the invention.

FIG. 1 shows an apparatus according to an example embodiment of the invention. The apparatus may be a cell, physically represented by a base station such as a Node B or eNodeB, or an element thereof. FIG. 2 shows a method according to an example embodiment of the invention. The apparatus according to FIG. 1 may perform the method of FIG. 2 but is not limited to this method. The method of FIG. 2 may be performed by the apparatus of FIG. 1 but is not limited to being performed by this apparatus.

The apparatus comprises monitoring means 10, selecting means 20, instructing means 30, determining means 40, time checking means 50, and replacing means 60. The monitoring means 10, selecting means 20, instructing means 30, determining means 40, time checking means 50, and replacing means 60 may be a monitoring circuitry, selecting circuitry, instructing circuitry, determining circuitry, time checking circuitry, and replacing circuitry, respectively.

The monitoring means 10 monitor if a cell is being started (S10). That is, the monitoring means 10 monitors if the cell starts operation, e.g. because the cell (i.e. the respective base station, or a component of the base station relevant for this cell) is booted after installation thereof. The following steps may or may not be performed if the base station is booted due to some bugs or similar after it has been fully configured.

The selecting means 20 select a temporary physical cell identifier among a predefined pool of temporary physical cell identifiers (S20). For example, the selection may be randomly.

S10 and S20 may be performed one after the other in any sequence or fully or partly in parallel. If the monitoring means 10 monitors that the cell is being started (S10="yes"), the instructing means 30 instructs the cell to adopt the temporary physical cell identifier selected by the selecting means 20 as the physical cell identifier of the cell (S30). That is, the selected temporary PCI is adopted at all occasions where a PCI is used by the cell.

The determining means 40 determines a permanent physical cell identifier for the cell (S40). The permanent physical cell identifier does not belong to the predefined pool. The permanent physical cell identifier is different from each used physical cell identifier. A physical cell identifier is a "used physical cell identifier" when it is indicated in at least one of the measurement reports received while the cell is instructed to adopt the selected temporary physical cell identifier. That is, each "used physical cell identifier" is indicated in a respective measurement report of all the measurement reports received while the cell is instructed to adopt the selected temporary physical cell identifier. It may be indicated in more than one of these measurement reports.

The time checking means 50 checks if at least one of a first time and a second time has elapsed (S50). The first time is measured after the cell has been instructed to adopt the selected temporary physical cell identifier. The second time is measured after the cell has been started. Typically, these times are nearly the same.

S40 and S50 may be performed one after the other in any sequence or fully or partly in parallel.

If at least one of the first time and the second time has elapsed (S50="yes"), the replacing means 60 replaces the selected temporary physical cell identifier by the determined permanent physical cell identifier as the physical cell identifier of the cell (S60). That is, the determined permanent PCI is adopted at all occasions where a PCI is used by the cell.

Figure 4:
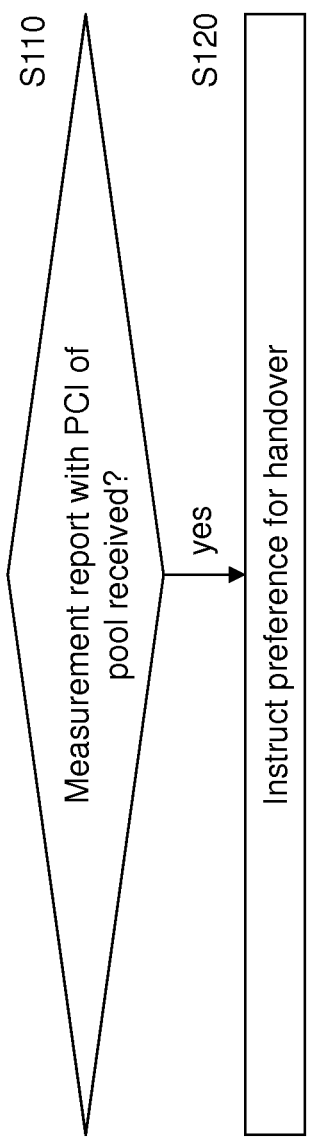
FIG. 4 shows a method according to an example embodiment of the invention.
Figure 3:
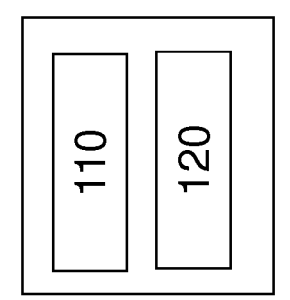
FIG. 3 shows an apparatus according to an example embodiment of the invention.

FIG. 3 shows an apparatus according to an example embodiment of the invention. The apparatus may be a cell, physically represented by a base station such as a Node B or eNodeB, or an element thereof. FIG. 4 shows a method according to an example embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises checking means 110 and instructing means 120. The checking means 110 and instructing means 120 may be a checking circuitry and instructing circuitry, respectively.

The checking means 110 checks if a measurement report is received from a terminal (S110). The measurement report indicates a physical cell identifier, wherein the indicated physical cell identifier belongs to a predefined pool of physical cell identifiers. The predefined pool may be a pool of temporary physical cell identifiers. There is at least one physical cell identifier not belonging to the predefined pool. That is, the predefined pool comprises only a subset of all physical cell identifiers.

If the physical cell identifier indicated in the measurement report belongs to the predefined pool (S110="yes"), the instructing means 120 instructs a control device (e.g. eNB, RNC) to give preference to a handover of the terminal to a target cell (S120). The target cell corresponds to the indicated physical cell identifier, that is, the target cell identifies itself by the indicated PCI.

Figure 6:
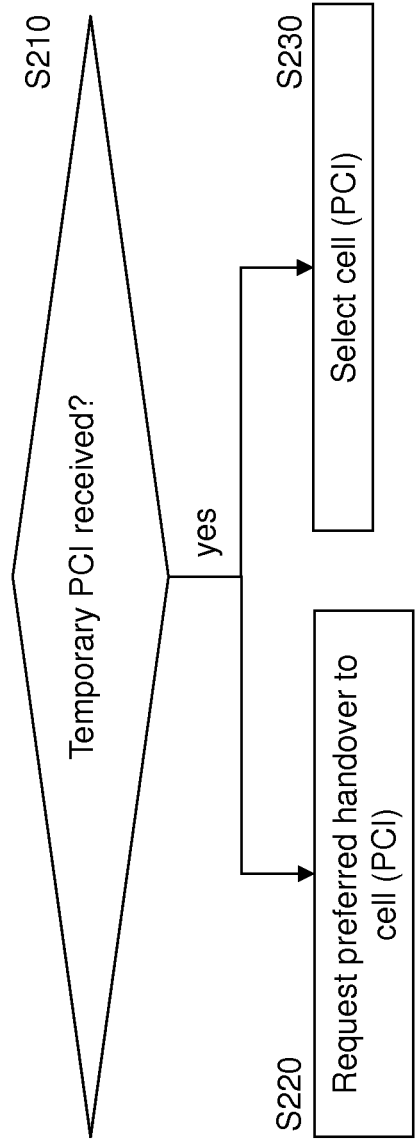
FIG. 6 shows a method according to an example embodiment of the invention.
Figure 5:
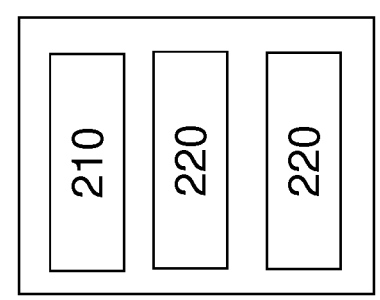
FIG. 5 shows an apparatus according to an example embodiment of the invention.

FIG. 5 shows an apparatus according to an example embodiment of the invention. The apparatus may be a terminal such as a UE, or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises checking means 210 and at least one of a requesting means 220 and a selecting means 230. The checking means 210, requesting means 220, and selecting means 230 may be a checking circuitry, a requesting circuitry, and a selecting circuitry, respectively.

The checking means 210 checks if a physical cell identifier is received from a cell not serving a terminal (S210). The received physical cell identifier belongs to a predefined pool of physical cell identifiers, wherein there is at least one physical cell identifier not belonging to the predefined pool. E.g., the pool may be a pool of temporary PCI's.

If the physical cell identifier belongs to the predefined pool (S210="yes"), the requesting means 220 request a preferred handover of the terminal to the cell from which the PCI of the pool is received (S220). The request may be send to a control device such as a eNB or RNC.

If the physical cell identifier belongs to the predefined pool (S210="yes"), the selecting means 230 select the cell from which the PCI of the pool is received for serving the terminal (S230). That is, at start up of the UE, the UE selects a cell adopting a temporary PCI as its PCI.

FIG. 7 shows an apparatus according to an example embodiment of the invention. The apparatus may be a management device such as a OQM system, or an element thereof. FIG. 8 shows a method according to an example embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises starting means 310, checking means 320, and inhibiting means 330. The starting means 310, checking means 320, and inhibiting means 330 may be a starting circuitry, checking circuitry, and inhibiting circuitry, respectively.

The starting means 310 starts a first cell such that the first cell adopts a first physical cell identifier out of a predefined pool of physical cell identifiers as a physical cell identifier of the first cell (S310). There is at least one physical cell identifier not belonging to the predefined pool.

The checking means 320 checks if a predefined waiting time has elapsed after the first cell has been started (S320).

If the predefined waiting time has not elapsed (S320="no"), the inhibiting means 330 inhibits the starting means 310 from starting a second cell (S330). The second cell is different from the first cell. If the starting means 310 starts the second cell, it is started such that it adopts a second physical cell identifier out of the predefined pool as a physical cell identifier of the second cell.

FIG. 9 shows an apparatus according to an example embodiment of the invention. The apparatus may be a management device such as a OQM system, or an element thereof. FIG. 10 shows a method according to an example embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises starting means 410, monitoring means 420, and inhibiting means 430. The starting means 410, monitoring means 420, and inhibiting means 430 may be a starting circuitry, monitoring circuitry, and inhibiting circuitry, respectively.

The starting means 410 starts a first cell such that the first cell adopts a first physical cell identifier out of a predefined pool of physical cell identifiers as a physical cell identifier of the first cell (S410). There is at least one physical cell identifier not belonging to the predefined pool.

The monitoring means 420 monitors if the first cell adopts the first temporary physical cell identifier as the physical cell identifier of the first cell (S420). That is, the monitoring means 420 monitors if the first cell is still in its "learning phase". This is particularly useful if the learning phase does not have a fixed duration.

If the first cell adopts the first temporary physical cell identifier as the physical cell identifier (S420="yes"), the inhibiting means 430 inhibits the starting means 410 from starting a second cell (S430). The second cell is different from the first cell. If the starting means 410 starts the second cell, it is started such that it adopts a second physical cell identifier out of the predefined pool as a physical cell identifier of the second cell.

In general, and in particular in FIGS. 7 to 10 and related description, physically, each cell (such as the first cell and the second cell) may be represented by a respective base station (e.g. NodeB or eNB) or a component thereof. Starting a cell means starting operation of the cell.

FIG. 11 shows an apparatus according to an example embodiment of the invention. The apparatus comprises at least one processor 610, at least one memory 620 including computer program code, and the at least one processor 610, with the at least one memory 620 and the computer program code, being arranged to cause the apparatus to at least perform at least one of the methods according to FIGS. 2, 4, 6, 8, and 10 and related description.

Embodiments of the invention may be deployed preferably in unlicensed bands. However, some embodiments of the invention may be deployed in licensed bands, too. In this case, they may provide an alternative to PCI allocation coordination via X2 or S1 interface. Thus, signaling load may be reduced. Note that, in this case, the operator may avoid any PCI collision if eNBs are started one after the other such that not more than one eNB in a certain area uses a temporary PCI at a time.

Embodiments of the invention may be employed not only in 3GPP networks (such as LTE, LTE-A) but also in other networks where a cell identifier is transmitted to identify a cell (e.g. in WiFi networks, where the SSID might be considered as a cell identifier corresponding insofar to the PCI of LTE).

In LTE, the number of different PCIs is 504. However, embodiments of the invention may be employed if the number of different PCIs (cell identifiers) is different from 504. The number may be arbitrary or not even limited. Embodiments of the invention are the more useful the more the number of different cell identifiers is limited.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

A terminal may be any device which may connect to the respective network. For example, a terminal may be a UE, a mobile phone, a laptop, a smartphone, a machine-type communication device, etc.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Embodiments of the invention may be employed fully or partly in the cloud, wherein a resource (e.g. processor, software, memory, network) for the respective task may be shared with other applications.

According to the above description, it should thus be apparent that example embodiments of the present invention provide, for example a base station such as a NodeB or a eNodeB, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a terminal such as a UE, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof.

It should be noted that the description of the embodiments is given by way of example only and that various modifications may be made without departing from the scope of the invention as defined by the appended claims.

The invention claimed is:

1. A method, comprising:
monitoring if a cell is being started;
selecting a temporary physical cell identifier among a predefined pool of temporary physical cell identifiers;
instructing the cell to adopt the selected temporary physical cell identifier as the physical cell identifier of the cell if the cell is being started;
receiving reporting of the cell instructed to adopt the selected temporary physical cell identifier as a potential handover target;
ordering handover to the cell;
determining a permanent physical cell identifier for the cell, wherein the permanent physical cell identifier does not belong to the predefined pool and is different from each used physical cell identifier, wherein each of the used physical cell identifiers is indicated in a respective measurement report received while the cell is instructed to adopt the selected temporary physical cell identifier;

evaluating a number of used physical cell identifiers indicated in a predefined number of measurement report received first after the cell was instructed to adopt the selected temporary physical cell identifier;

setting at least one of a first time and a second time based on the number of used physical cells if the respective one of the first time and the second time is not predefined;

checking if at least one of the first time has elapsed after the cell has been instructed to adopt the selected temporary physical cell identifier and the second time has elapsed after the cell has been started;

replacing the selected temporary physical cell identifier by the determined permanent physical cell identifier as the physical cell identifier of the cell if the at least one of the first time and the second time has elapsed.

2. The method according to claim 1, wherein at least one of the first time and the second time is predefined.

3. The method according to claim 1, wherein the replacing comprises rebooting the cell in order to replace the selected temporary physical cell identifier by the determined permanent physical cell identifier as the physical cell identifier of the cell.

4. A computer program product embodied on a non-transitory computer-readable medium, said product comprising a set of instructions which, when executed on an apparatus, is configured to cause the apparatus to carry out the method according to claim 1.

5. An apparatus, comprising:

at least one processor; and at least one memory including computer program code;

the at least one memory and the computer program code being configured to, with the at least one processor, cause the apparatus to perform monitoring if a cell is being started;

selecting a temporary physical cell identifier among a predefined pool of temporary physical cell identifiers;

instructing the cell to adopt the selected temporary physical cell identifier as the physical cell identifier of the cell if the cell is being started;

receiving reporting of the cell instructed to adopt the selected temporary physical cell identifier as a potential handover target;

ordering handover to the cell;

determining a permanent physical cell identifier for the cell, wherein the permanent physical cell identifier does not belong to the predefined pool and is different from each used physical cell identifier, wherein each of the used physical cell identifiers is indicated in a respective measurement report received while the cell is instructed to adopt the selected temporary physical cell identifier;

evaluating a number of used physical cell identifiers indicated in a predefined number of measurement report received first after the cell was instructed to adopt the selected temporary physical cell identifier;

setting at least one of the first time and the second time based on the number of used physical cells if the respective one of the first time and the second time is not predefined;

checking if at least one of the first time has elapsed after the cell has been instructed to adopt the selected temporary physical cell identifier and the second time has elapsed after the cell has been started;

replacing the selected temporary physical cell identifier by the determined permanent physical cell identifier as the physical cell identifier of the cell if the at least one of the first time and the second time has elapsed.

6. The apparatus according to claim 5, wherein at least one of the first time and the second time is predefined.

7. The apparatus according to claim 5, wherein the replacing comprises rebooting the cell in order to replace the selected temporary physical cell identifier by the determined permanent physical cell identifier as the physical cell identifier of the cell.

* * * * *